July 15, 1924.
J. BOWEN
CASTER WHEEL
Filed Feb. 27, 1923
1,501,743
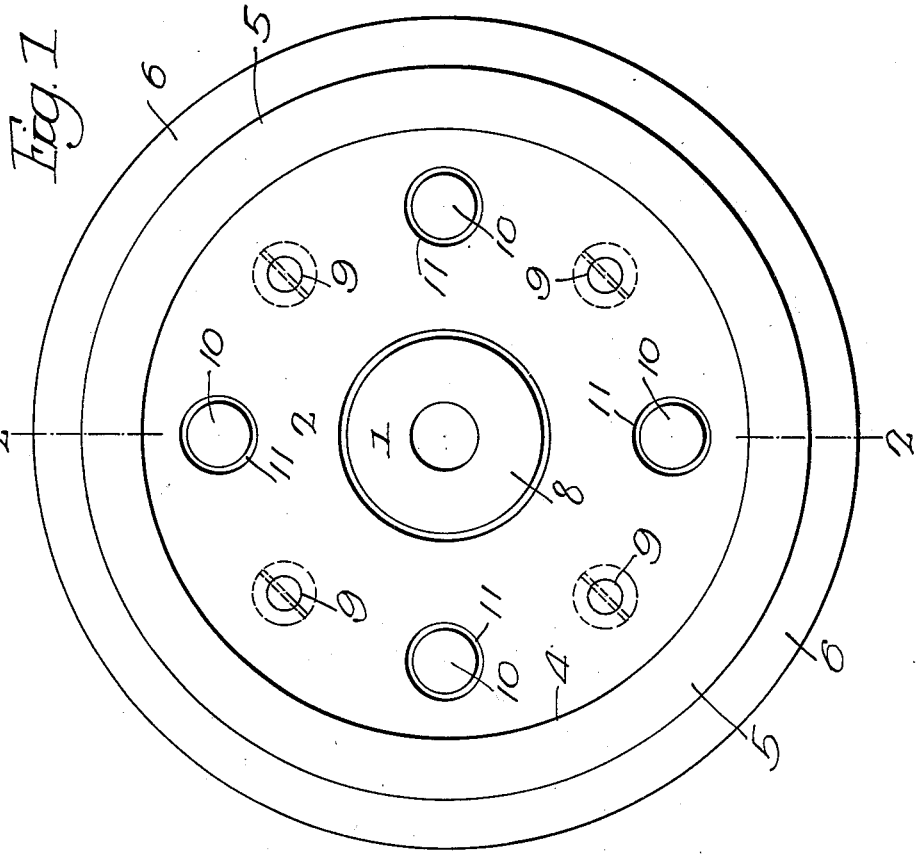
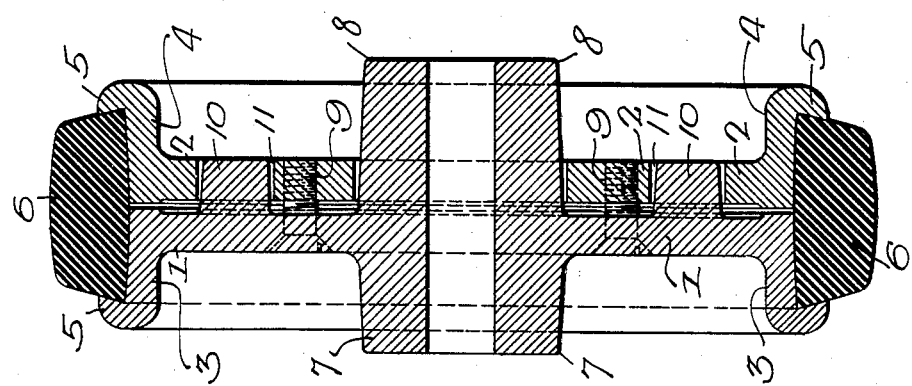
Inventor.
James Bowen.
by his Attorneys.
Howson & Howson Patented July 15, 1924.

1,501,743

UNITED STATES PATENT OFFICE.

JAMES BOWEN, OF MANHEIM, PENNSYLVANIA, ASSIGNOR TO BOND FOUNDRY AND MACHINE COMPANY, OF MANHEIM, PENNSYLVANIA, A CORPORATION OF PENNSYLVANIA.

CASTER WHEEL.

Application filed February 27, 1923. Serial No. 621,610.

*To all whom it may concern:*

Be it known that I, JAMES BOWEN, a citizen of the United States, residing in Manheim, Lancaster County, Pennsylvania, have invented Caster Wheels, of which the following is a specification.

This invention relates to wheels or rollers such as are customarily used on hand trucks, small cars and the like, and one object of the invention is to provide a wheel or roller of this type which shall be relatively strong, rigid and durable.

A further object of the invention is to provide a truck wheel or caster including two body members so connected as to be capable of successfully resisting without injury the knocks and jars to which they are exposed under conditions of use, and the invention more especially contemplates such an arrangement of parts as will hold said body members of the wheel against relative circumferential movement with a resulting objectionable stress on the screws holding said members together, while permitting of the ready assembly or separation of the wheel parts.

These objects and other advantageous ends I attain as hereinafter set forth, reference being had to the accompanying drawings, in which, Fig. 1 is a side elevation of a truck wheel constructed in accordance with my invention; and, Fig. 2 is a vertical section on the line 2—2, Fig. 1.

In the above drawings, 1 and 2 represent two substantially circular plates or discs which at their outer edges are formed with oppositely projecting flanges 3 and 4 providing a flat rim. Each of these flanges has an outwardly extending marginal rib 5 which is under-cut so as to cooperate in defining a dovetailed recess for the reception of a solid rubber or other suitable tire 6. The plate constituting the body member 1 is provided with a hub having two oppositely extending parts 7 and 8 centrally perforated for the reception of a spindle or axle. The part 8 of said hub projects through a central opening in the body member 2 and said two members are separably held together against lateral movement by a series of screws 9 threaded into the member 2 and preferably having their heads countersunk in the member 1.

In order to relieve said screws of shearing stress caused by relative circumferential movement of said two members 1 or 2, in the present case the former is provided with a series of lugs or projections 10 extending laterally into and closely fitting suitably formed openings 11 in the other member 2, there being any desired number of these lugs which in the case illustrated have the form of substantially cylindrical pins formed integral with the member 1.

In the above described arrangement of parts, the two body members 1 and 2 may be easily and quickly assembled merely by the insertion and setting up of the screws 9 and when so held together firmly clamp in position the tire 6. The resulting structure is strong and rigid and the projections 10 effectually resist any shearing stress brought upon them by the tendency of one of the members 1 or 2 to rotate relatively to the other, thus protecting the screws 9 from injury. As a consequence said screws may be relatively small in size and possess sufficient strength merely to prevent the lateral separation of the two body members comprised by the plates 1 and 2.

I claim:

1. The combination in a wheel for trucks and the like, of two circular members each having an undercut beveled flange, a rubber tire fitting the space between the flanges, one member having a hub the other member having an opening through which the hub extends; lugs on one member fitting holes in the other members, and screws securing the two members together and clamping the tire between the flanges of the members.

2. The combination in a truck wheel, of two circular members, one member having a hub, the other member having a central opening through which the hub of the other member extends, each member having an undercut beveled rim; a rubber tire having beveled sides and mounted between the flanges of the rim; a series of lugs projecting from the side of the member having the hub; and a series of screws alternating with the lugs and extending through the member having the lugs and screwed into the other member, the last mentioned member having openings to receive the lugs preventing one member moving on the other.

JAMES BOWEN.